US012781889B1

(12) United States Patent
Craig

(10) Patent No.: US 12,781,889 B1
(45) Date of Patent: Nov. 3, 2026

(54) COMBINATION MOUNTING FITTING AND TRI CLAMP FOR RELEASABLE SANITARY TUBE CONNECTIONS

(71) Applicant: James E. Craig, New Hartford, MO (US)

(72) Inventor: James E. Craig, New Hartford, MO (US)

(73) Assignee: SRM, LLC, Springfield, MO (US)

( * ) Notice: Subject to any disclaimer, the term of this patent is extended or adjusted under 35 U.S.C. 154(b) by 214 days.

(21) Appl. No.: 18/435,177

(22) Filed: Feb. 7, 2024

Related U.S. Application Data

(63) Continuation-in-part of application No. 18/489,168, filed on Oct. 18, 2023, now abandoned.

(60) Provisional application No. 63/379,962, filed on Oct. 18, 2022.

(51) Int. Cl.
*F16L 23/08* (2006.01)

(52) U.S. Cl.
CPC ........... *F16L 23/08* (2013.01); *F16L 2201/44* (2013.01)

(58) Field of Classification Search
CPC ........ F16L 23/08; F16L 2201/44; F16B 37/16
USPC .......................................................... 411/435
See application file for complete search history.

(56) References Cited

U.S. PATENT DOCUMENTS 4,123,095 A 10/1978 Stehlin .................... F16L 23/00
5,499,849 A 3/1996 Fend ....................... F16L 23/08
5,522,625 A * 6/1996 Flick ....................... F16L 23/10 285/410
6,234,545 B1 * 5/2001 Babuder ................. F16L 23/22 285/364
6,367,843 B1 * 4/2002 Fetzer ...................... C10B 25/10 285/411
6,672,631 B1 1/2004 Weinhold ................ F16L 23/00
8,196,971 B2 6/2012 Hansen .................... F16L 23/00
D954,521 S 6/2022 Jenney ............................. D8/72
2005/0258648 A1 * 11/2005 Newman ................. F16L 23/10 285/364
2014/0132000 A1 * 5/2014 Ben-Horin .......... F16K 27/0218 285/373
2022/0333721 A1 10/2022 Jenney .................... F16L 23/08

FOREIGN PATENT DOCUMENTS

EP 1693609 B1 1/2013 .............. F16L 23/10

* cited by examiner

*Primary Examiner* — James M Hewitt, II
(74) *Attorney, Agent, or Firm* — Jonathan A. Bay

(57) ABSTRACT

A combination mounting fitting and clamp for releasable sanitary tube connections may be attached to a tank, vessel, piping or other sanitary process equipment requiring low deadspace (low profile)/cleanable design. The clamp has plural hinged-together segments and a tightening sub-assembly that, in normal operation, maintains the clamp captive to the mounting fitting by means of geometry and restricted range of motion of the clamp relative to the mounting fitting. The clamp provides ergonomic improvements over existing hygienic fittings by keeping the clamp captive to the mounting fitting, allowing a single operator to (1) assemble/position the mating sanitary ferrule connection to the combination clamp/mounting-fitting using one hand and (2) allowing the clamp to be tightened by the other hand. Other designs for low deadspace sanitary tube connections require multiple people and more than two hands to install the mating sanitary connection.

16 Claims, 16 Drawing Sheets

COMBINATION MOUNTING FITTING AND TRI CLAMP FOR RELEASABLE SANITARY TUBE CONNECTIONS

CROSS-REFERENCE TO PROVISIONAL APPLICATION(S)

This application is a continuation-in-part of U.S. patent application Ser. No. 18/489,168, filed Oct. 18, 2023, now abandoned, which claims the benefit of U.S. Provisional Application No. 63/379,962, filed Oct. 18, 2022. The foregoing patent disclosure(s) is(are) incorporated herein by this reference thereto.

BACKGROUND AND SUMMARY OF THE INVENTION

The invention relates to hand tightened clamps for sanitary tank components, and, more particularly, to a combination of (1) a mounting fitting with (2) such a clamp that are cooperatively configured to provide improvements for releasable sanitary tube connections. The improvements enable a single user to both (1) position the tube connection in place and (2) hand-tighten the clamp, thereby obviating the need for help from a second user.

The preferred style of clamp disclosed for example and without limitation in this disclosure has a long-form name of:—'wingnut tightened tri clamp double hinge assembly' (or some variation thereof). So, the 'nut' is typically a wingnut. And, the term 'tri' is believed to be a shortening of 'trifolium' or 'tri clover,' as in that there are three (3) one-hundred and twenty degree (120°) ring segments, with one of the segments hinged at both ends to the other two segments, and thus together can be cooperatively closed to form a clamping circle (or near circle).

In this disclosure, the clamp is more than likely to be referred by various short-form names, such as clamp or tri clamp.

The mounting fitting is intended to be attached to a tank, vessel, piping or other sanitary process equipment. The typical manner of 'attachment' is welding. Hence the mounting fitting is very typically permanently attached.

The mounting fitting provides the clamp with an annular flange to clamp onto for the sake of, making a manually clamped and manually releasable sanitary tube connection. For convenience sake for this disclosure, it desirable to introduce certain relative directions. The tube connection mentioned above is, needless to say, hollow tubing having lumen defining a flow passage. The mounting fitting also defines a flow passage, which in the preferred embodiment comprises a conically symmetric lumen about a central axis. Starting at the mounting flange and moving into the tank, this direction is the 'inboard' direction. In the opposite direction, starting again the mounting flange and moving out to the tube connection, this direction is the 'outboard' direction.

The three segments of the tri clamp, when closed tight, not only form an annular channel that opens inward but also receive within that annular channel the mounting fitting's annular flange, and clamps onto it. The tube connection is typically a weld ferrule at the connection end of an external process component or system (not shown here). This tube connection also terminates in an annular flange which is sandwiched with the mounting fitting's annular flange in the tri clamp.

The annular channel of the tri clamp in which all this clamping happens is defined by an inboard annular flange and outboard annular flange spaced by an annular web.

The clamp is loosened and tightened by hand-turning the wingnut, which travels between extremes by traveling on a stationary threaded shaft. The wingnut has a natural 'tightened' extreme when the clamp is shut tight.

However, in the other direction, it is an aspect of the invention to impose an opposite travel limit, comprising a loosened extreme.

It is a further aspect of the invention that (1) the tube connection can be withdrawn from the loosened clamp, while (2) at the same time the loosened clamp cannot be taken off the mounting fitting's annular flange.

Thus in the loosened state, the tri clamp dangles like a bangle on a wrist that can't be slid off over the hand. That way, for users of the clamp, the clamp will always be dangling in the place just where it needs to be.

A single user can position the tube connection with one hand and turn the wingnut with the other hand, all while being free of concern that the clamp might dislodge and fall.

But as to how the clamp is connected in the first place, so as to be more or less 'unremovable' after that, will be more particularly described below, as in undoing a screw connection at one of the hinge joints between two of the segments.

These and other aspects and objects are provided according to the invention in a combination of a mounting fitting with a clamp assembly for releasable sanitary tube connections which include an intermediary gasket; said combination comprising:

- a mounting fitting; and
- a clamp assembly;
- the mounting fitting having a stepped or tapered hub/annular-flange that provides an interface to the clamp assembly to allow for compression of the sanitary gasket and for pressure retention;
- the clamp assembly comprising:
  - three clamp segments each covering approximately one third of the circumference of the sanitary tube connection, each comprising:
    - a mating face to the stepped or tapered hub/annular-flange,
      - which is concentric to center axis of the mounting fitting when the clamp is tightened,
      - which is not concentric to the center axis of the mounting fitting when the clamp is loose;
    - a mating face to the sanitary tube connection taper that is installed in the mounting fitting,
      - which is concentric to the center axis of the sanitary tube connection when the clamp is tightened,
      - which is not concentric to the center axis of the sanitary tube connection when the clamp is loose;
    - a central semi-cylindrical surface on each clamp section,
      - which is concentric to the center axis of the sanitary tube connection when the clamp is loose, whereby allowing for less opening of the clamp to release the connected sanitary tube connection,
      - which is not concentric to the center axis of the sanitary tube connection when the clamp is tightened;
  - two hinge screws that connect the three clamp segments together to encompass the circumference of the sanitary tube connection;

- a wingnut that is used to tighten or loosen the clamp while keeping the clamp captive on the mounting fitting, wherein the wingnut has a retention-slot/annular-race to allow the wingnut to force the clamp open when the wingnut is loosened;
- a barrel nut that provides a pivot and an anchor point for a socket head cap screw that the wingnut is tightened and loosened on; and
- a wingnut pivot bearing that retains the wingnut to one of the clamp segments with two retainer pins that penetrate the pivot pin and reside in the retention slot on the wingnut.

A number of additional features and objects will be apparent in connection with the following discussion of the preferred embodiments.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
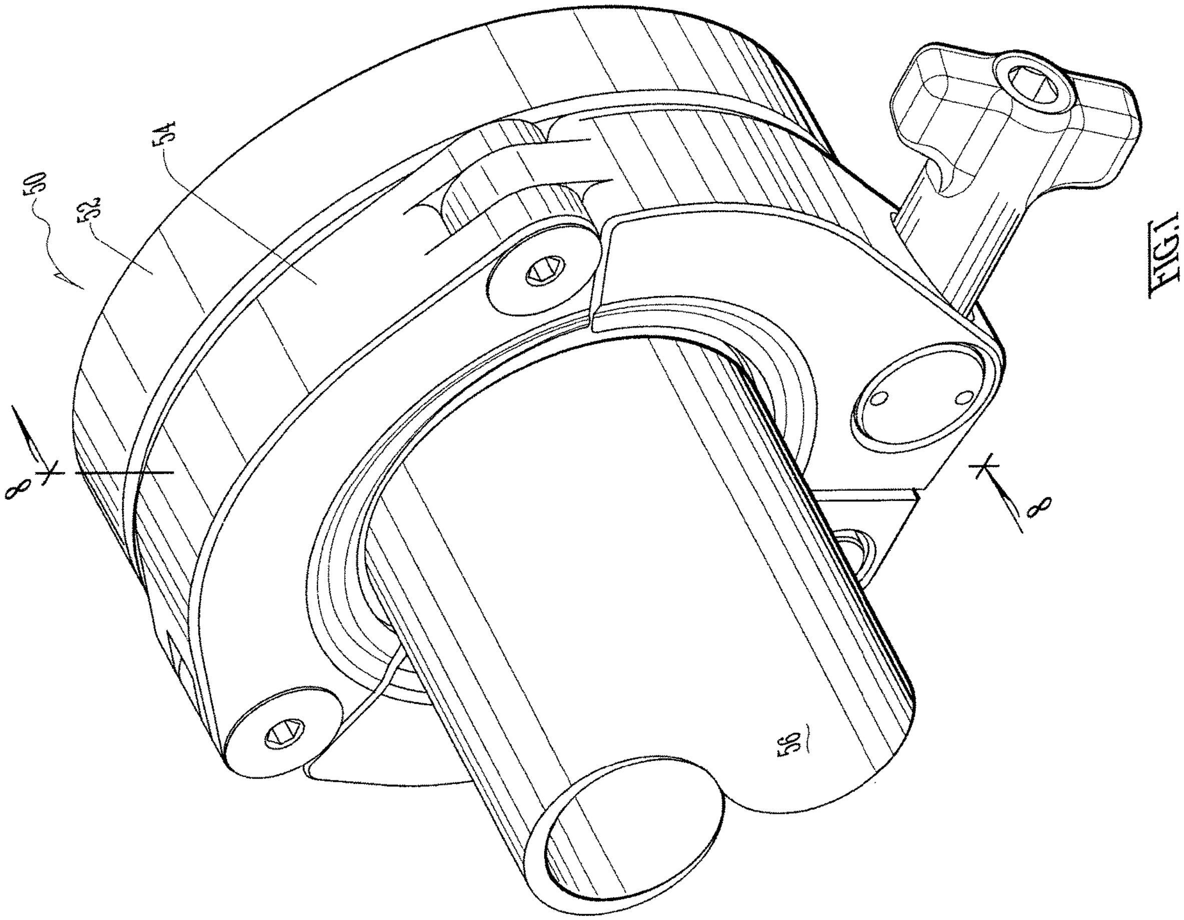
FIG. 1 is a perspective view of a combination in accordance with the invention of a mounting fitting and tri clamp for making repeated manual connections and manual disconnections between sanitary tank components (not shown) and sanitary process equipment (represented only by a ferrule, or 'weld' ferrule in this view)
Figure 15:
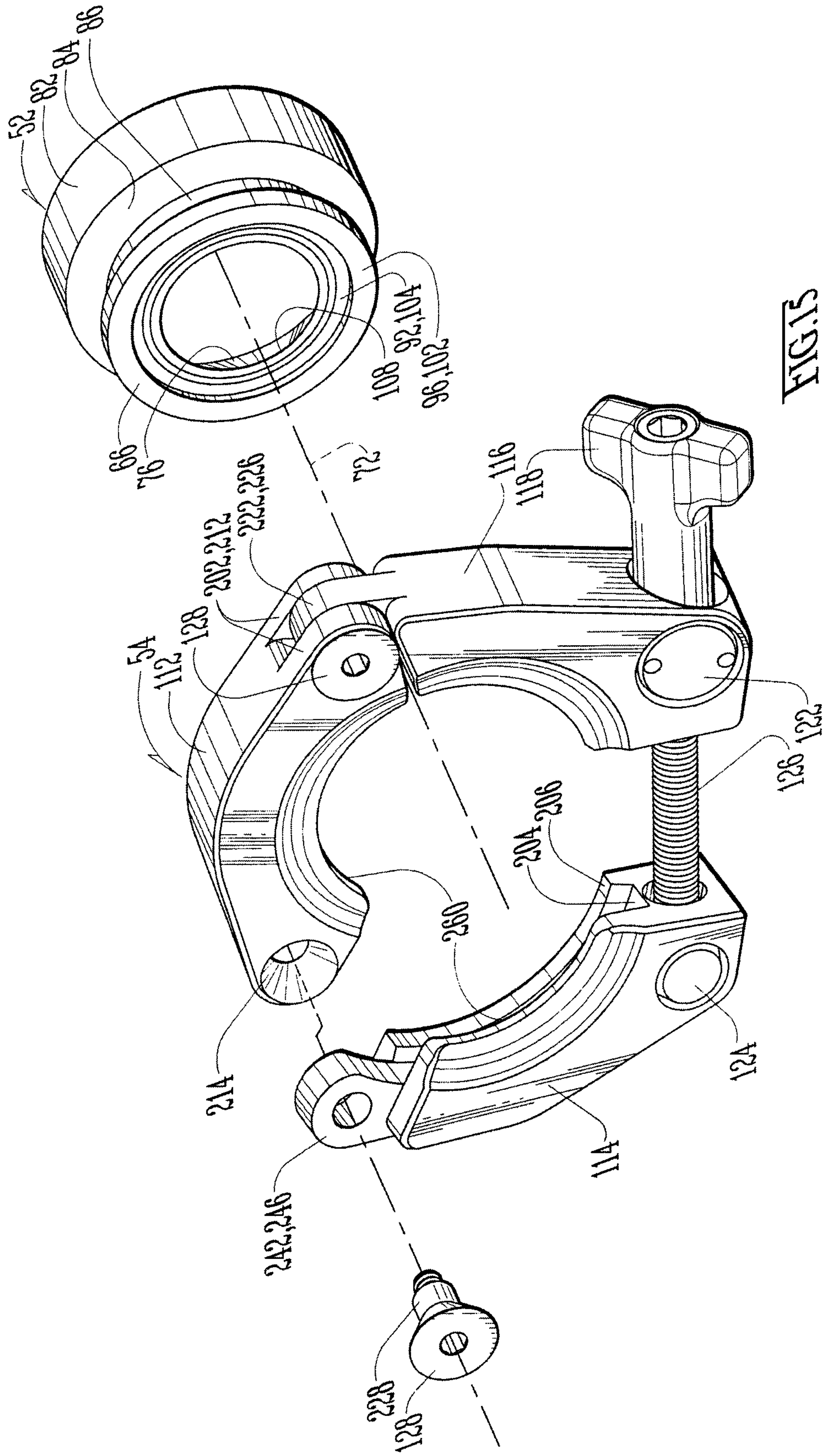
FIG. 15 is a perspective view comparable to FIG. 14 except including the mounting fitting and except further showing the tri clamp in a limited state of disassembly by unfastening one or the other of the pair of flat head shoulder screws (which serve as the hinge pins) just so much as to show how the tri clamp and mounting fitting are united at an original time, such that thereafter, the tri clamp and mounting fitting are more or less permanently inseparable.

FIG. 1 shows various aspects of a combination 50 in accordance with the invention largely in the absence of its use environment, whereas FIG. 15 shows the combination 50 better in the absence of all use environment.

Figure 2:
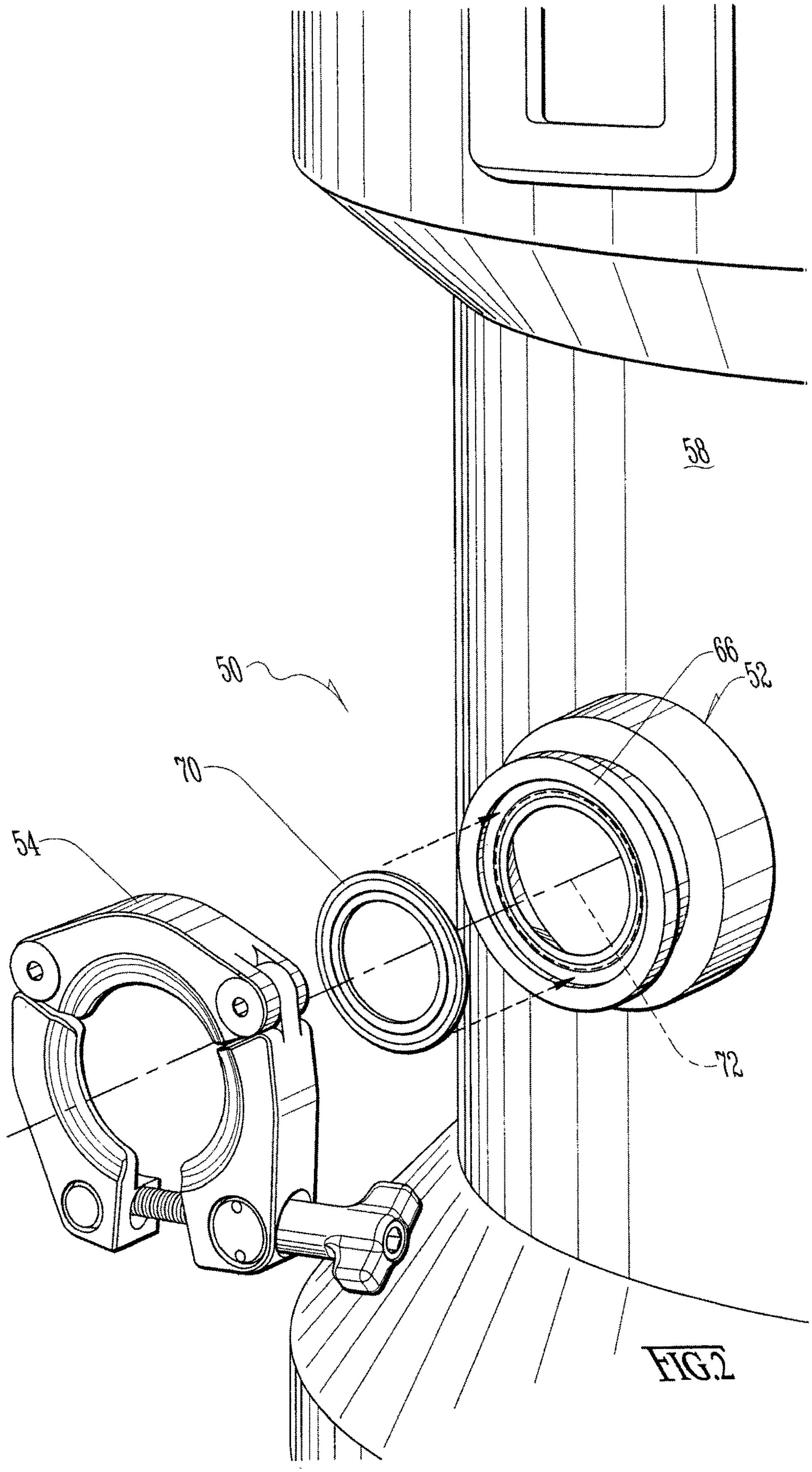
FIG. 2 is a reduced-scale perspective view comparable to FIG. 1 except showing the tri clamp and mounting fitting exploded apart, however, the tri clamp and mounting fitting are united at an original time such that thereafter the tri clamp and mounting fitting are more or less permanently inseparable; and wherein a sanitary tank component and an elastomeric gasket are also included in the view; and given that the tri clamp and mounting fitting are more or less permanently inseparable, that gasket will be more or less captive between the more or less permanently inseparable tri clamp and mounting fitting except that given the gasket's pliability, the gasket can be replaced with a fresh gasket without separating the tri clamp and mounting fitting.
Figure 3:
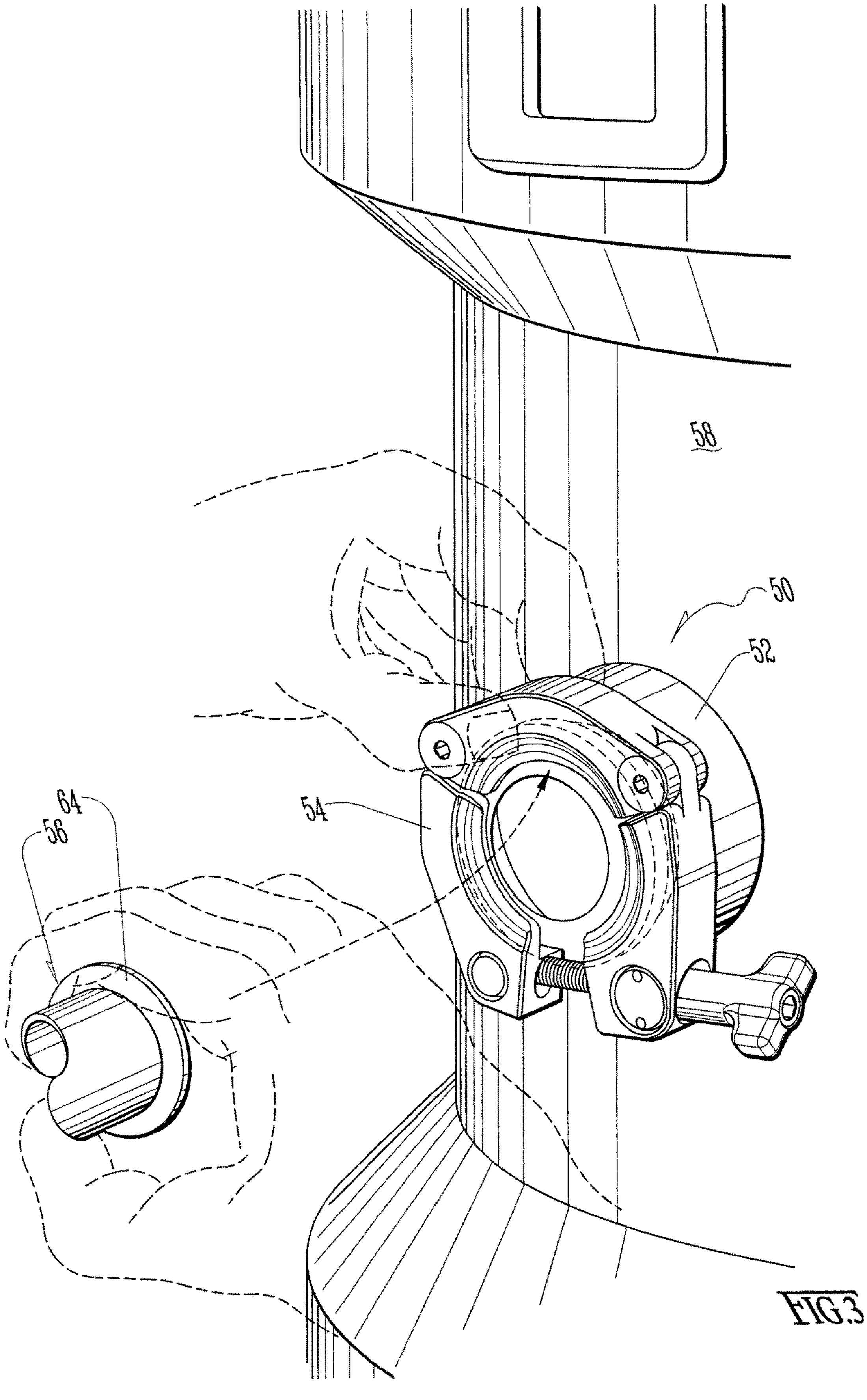
FIG. 3 is a perspective view comparable to FIG. 2 except showing a user in the stages of manually connecting the ferrule to the combination tri clamp and mounting fitting to form a sanitary tube connection between the sanitary tank component and sanitary process equipment (represented only by the ferrule), wherein the tri clamp is shown in an extreme state (more or less) of being FULLY OPENED or FULLY LOOSENED, and at the same time being lifted by the user.
Figure 4:
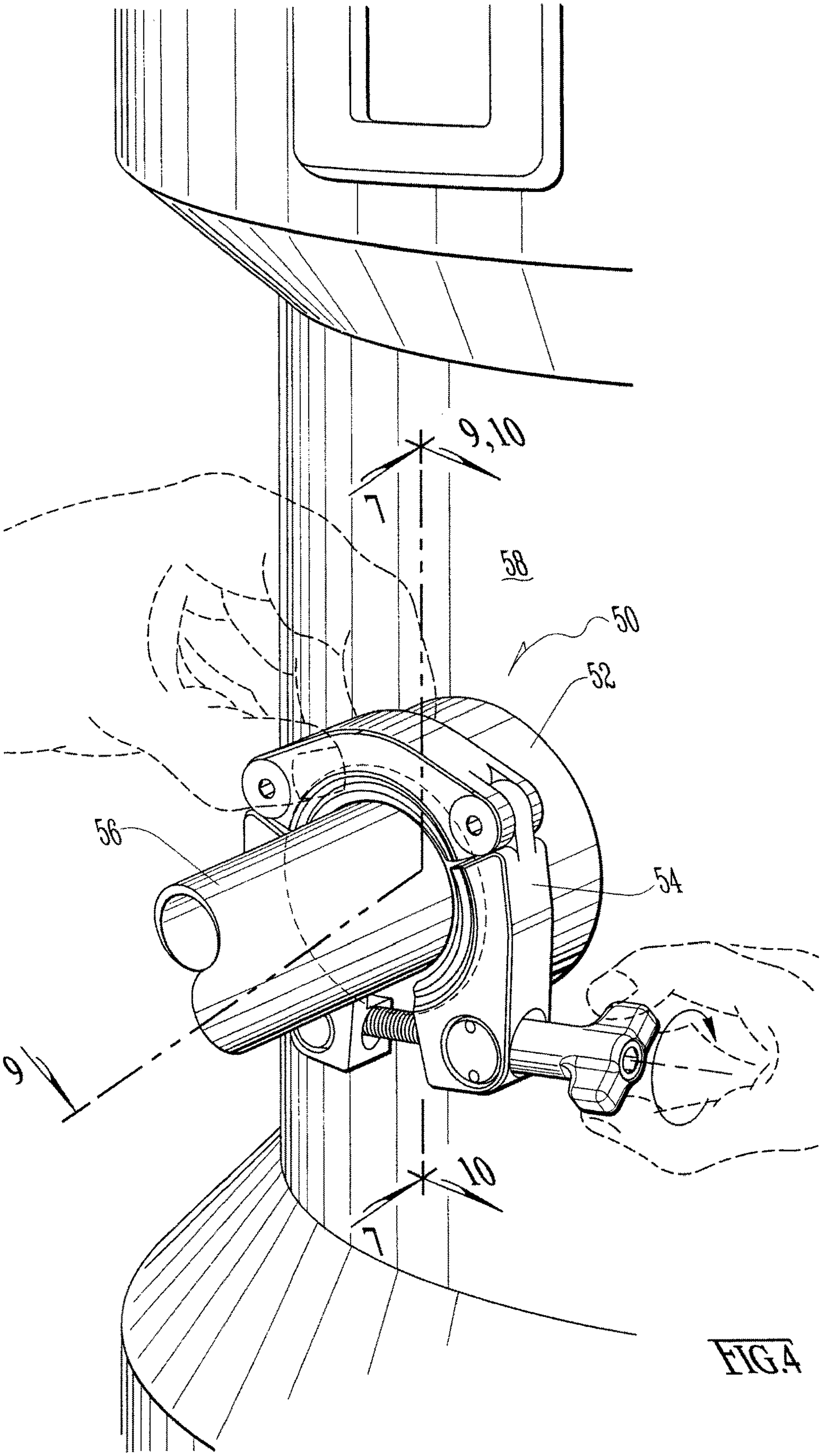
FIG. 4 is a perspective view comparable to FIG. 3 except showing the user manually tightening a wingnut in order to clamp (or close) the tri clamp, wherein the tri clamp is in an intermediate OPENED or LOOSENED state.
Figure 5:
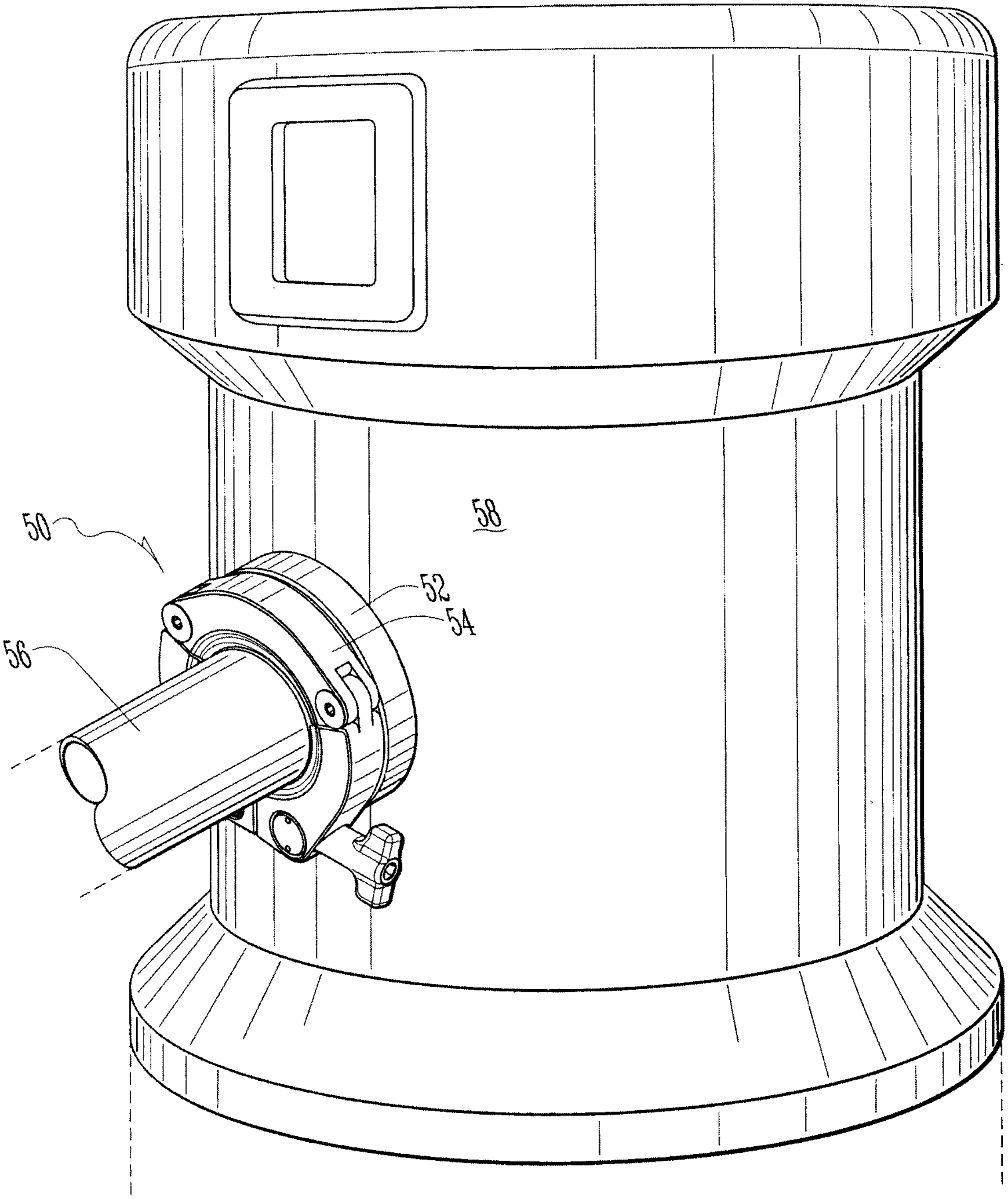
FIG. 5 is a perspective view comparable to FIG. 4 except showing that the user (the hands whereof being removed from the view) has completed the manual connection between the ferrule and combination tri clamp/mounting fitting, wherein the tri clamp is shown in an extreme state of FULLY CLOSED or FULLY CLAMPED.

FIG. 2 shows that the combination 50 comprises a tri clamp 54 and a mounting fitting 52 in accordance with the invention, and further shows the tri clamp 54 and mounting fitting 52 exploded apart. However, the tri clamp 54 and mounting fitting 52 are united at an original time such that thereafter, as shown better by FIGS. 1 and 3-5 as well as 7-12, the tri clamp 54 and mounting fitting 52 are more or less permanently inseparable (or at least without a hex wrench or a drive tool of specific geometry to undo the flat head shoulder screws that serve as the hinge pins, according to their specific drive geometry, hex or whatever, and see FIG. 15).

So to turn to FIG. 15, it shows how the tri clamp 54 and mounting fitting 52 are united at that original time. That is, at the original time, the central yoke link 112 and one or the other of the side links 114 or 116 are unfastened apart (or undone, as shown) and then re-fastened (re-joined) together to form a more or less permanently inseparable couple with the mounting fitting 52 (see any of FIGS. 1, 3-5 or 7-12). Again, after that original union, the tri clamp 54 and mounting fitting 52 are more or less permanently inseparable. The tri clamp 54 has a limited extreme state of being FULLY OPENED or FULLY LOOSENED which does not allow the tri clamp 54 to separate apart from the mounting fitting 52. Instead, in the extreme state of being FULLY OPENED or FULLY LOOSENED, the tri clamp 54 hangs like a 'bangle' (the tri clamp 54) on a 'wrist' (the intermediate annular groove 86 of the mounting fitting 52), wherein the tri clamp 54 when FULLY OPENED or FULLY LOOSENED, opens up at its widest a lumen which is too small to make the crossing over the 'hand' (the outboard annular flange 66 of the mounting fitting 52).

Figure 6:
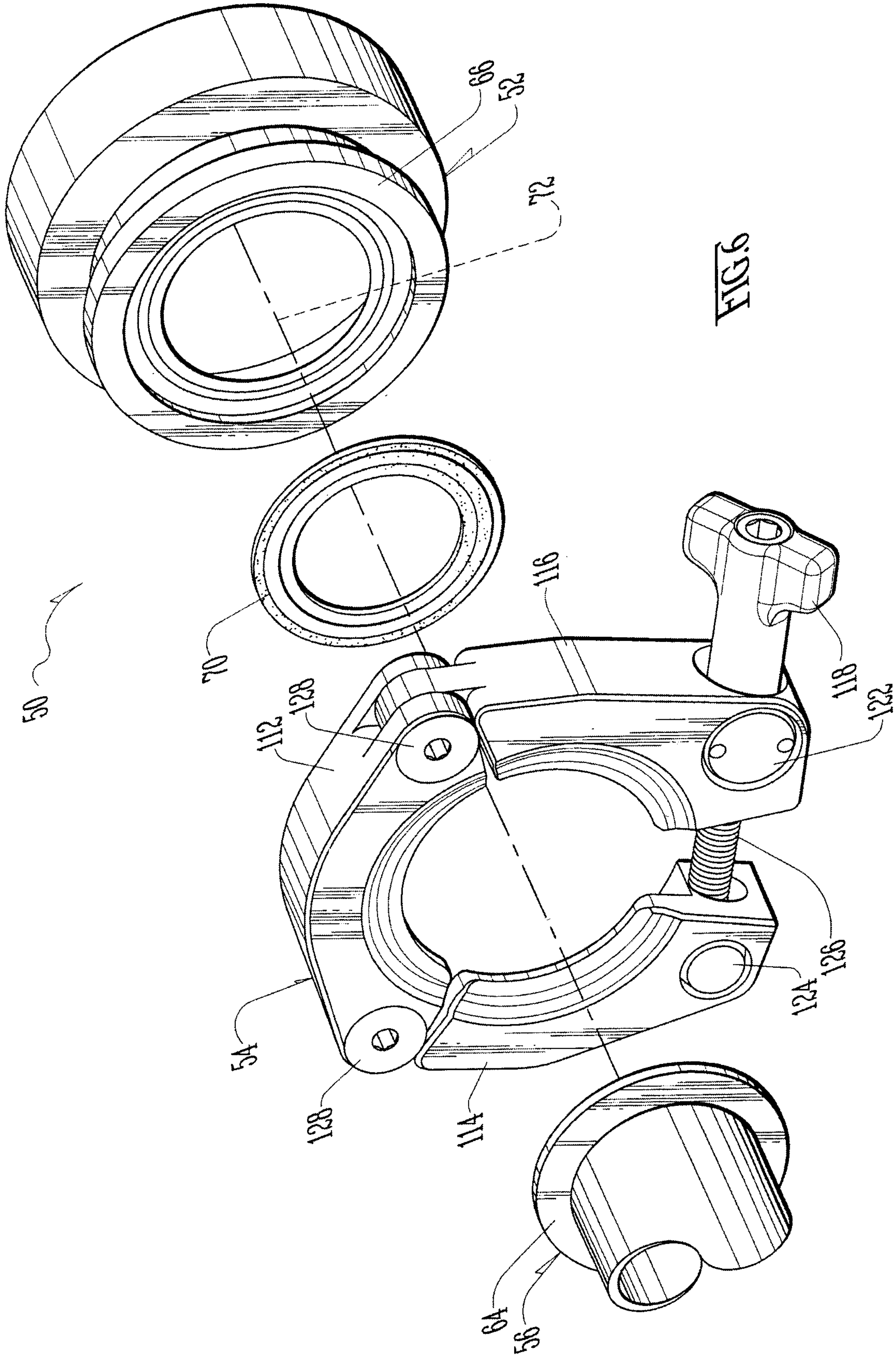
FIG. 6 is a perspective view comparable to FIG. 2 except on an enlarged-scale, and with the environment comprising the sanitary tank component removed from view while instead showing the ferrule representing the business end of sanitary process equipment (which is/are otherwise not shown)
Figure 7:
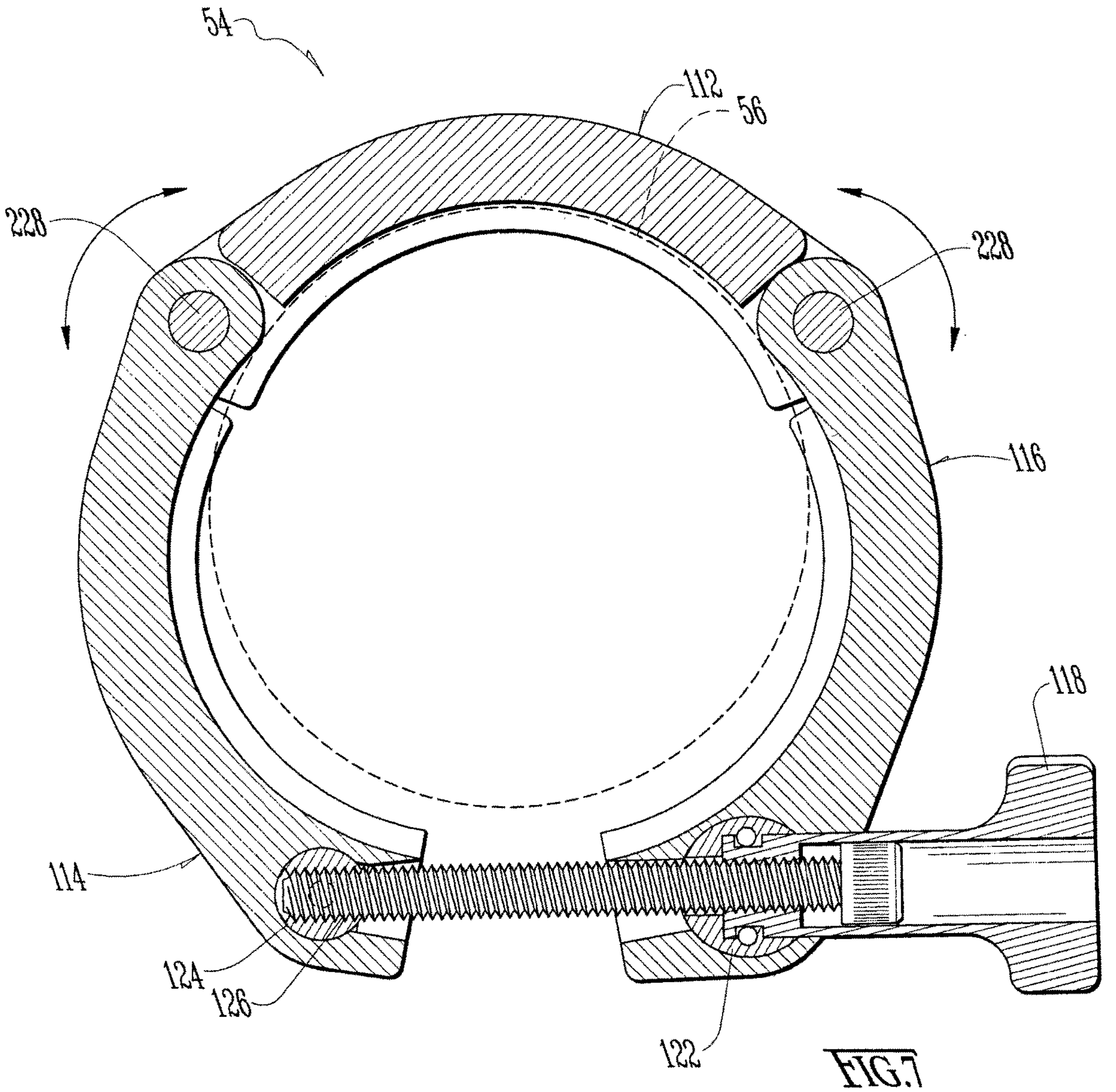
FIG. 7 is an enlarged-scale partial sectional view taken along line 7-7 as well as in the direction of arrows 7-7 in FIG. 4, showing the tri clamp in an intermediate state of being OPENED or LOOSENED.

FIG. 6 is a perspective view comparable to FIG. 2 except on an enlarged-scale, and with the environment comprising the sanitary tank component 58 removed from view while instead showing a ferrule 56 representing the business end of sanitary process equipment (which is/are otherwise not shown).

In other respects, FIGS. 2 through 5 show various aspects of the combination 50 in accordance with the invention of the mounting fitting 52 and tri clamp 54 for making releasable sanitary tube connections 56 with sanitary tank components 58.

FIGS. 6 through 12 show various aspects of the combination 50 in accordance with the invention of the mounting fitting 52 and tri clamp 54 for releasable sanitary tube connections 56, but apart from the sanitary tank components 58.

Figure 13:
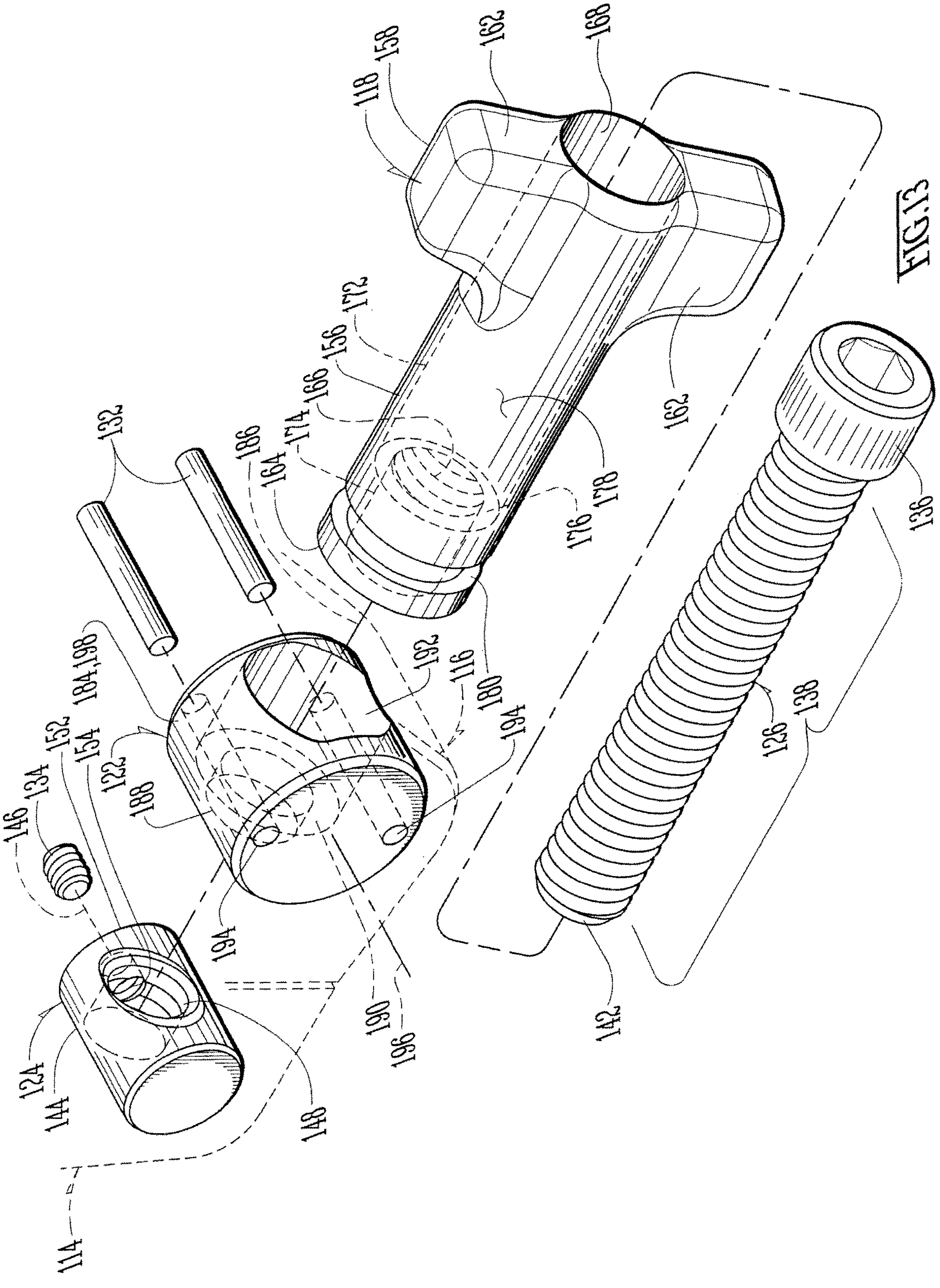
FIG. 13 is an enlarged-scale exploded perspective view of the wingnut and its companion assembly components, wherein other portions of the tri clamp comprising three arcuate segments and a pair of flat head shoulder screws are removed from view.
Figure 14:
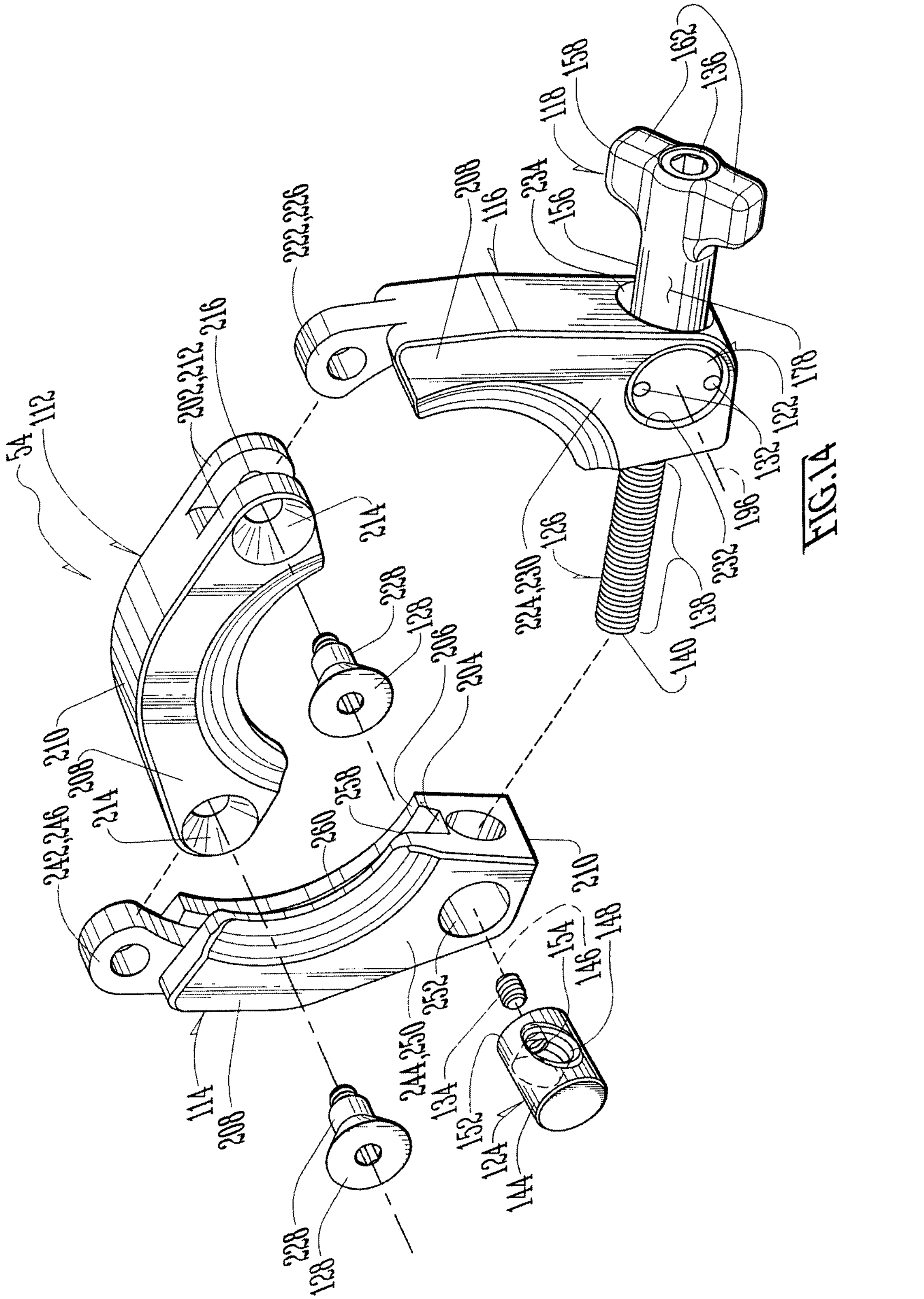
FIG. 14 is a perspective view of the tri clamp exploded in part including (i) the wingnut and its companion assembly components, (ii) the three arcuate segments and (iii) the pair of flat head shoulder screws (which serve as the hinge pins)

FIGS. 13 and 14 show various aspects of the tri clamp 54 in accordance with the invention apart from, not only the releasable sanitary tube connections 56 but also, the mounting fitting 52.

FIG. 15 shows how the tri clamp 54 and mounting fitting 52 are united at an original time such that thereafter, the tri clamp 54 and mounting fitting 52 are more or less permanently inseparable (in the absence of tools instead of just a user-hand cranking the options afford to the user).

Figure 8:
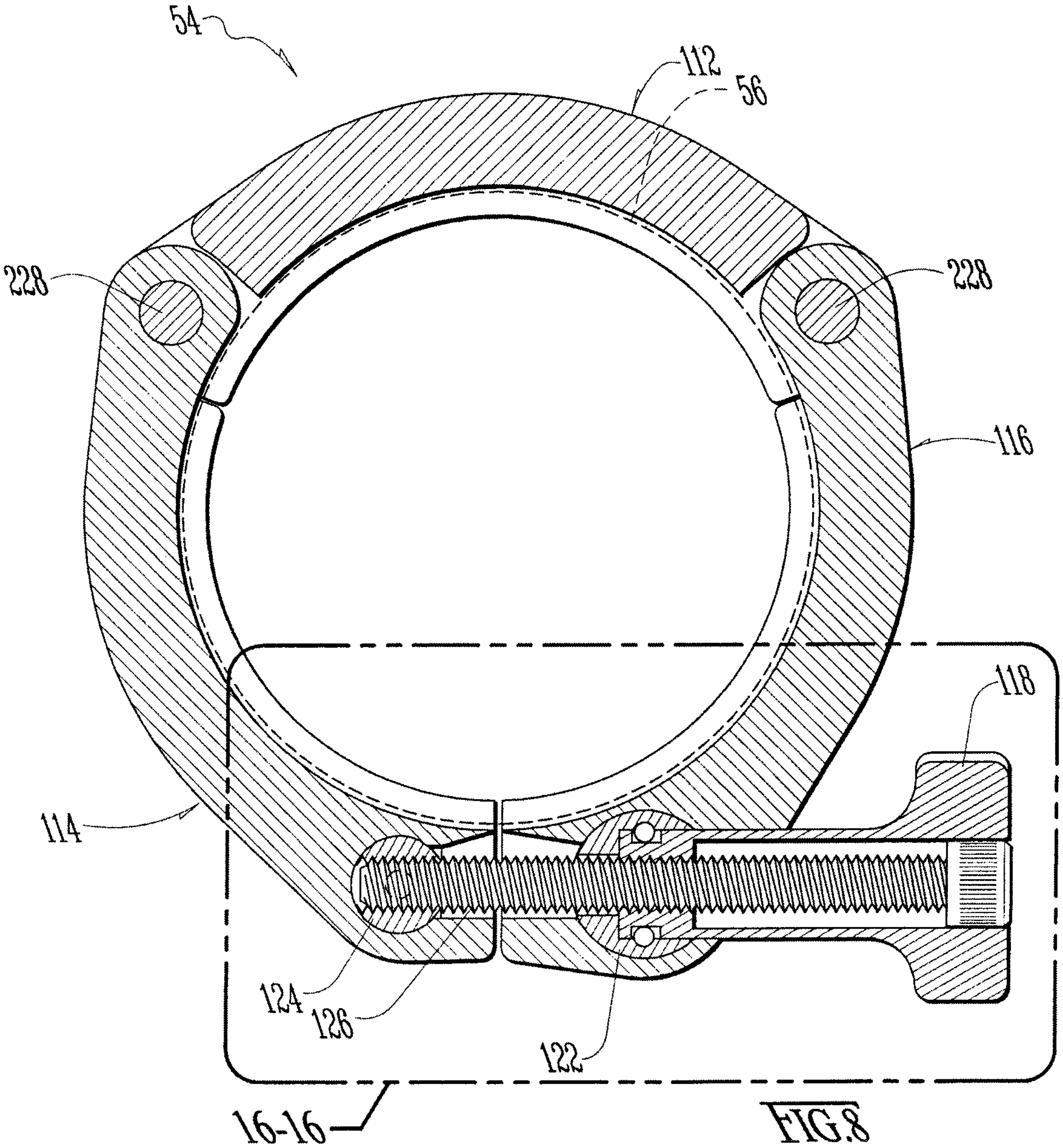
FIG. 8 is an enlarged-scale partial sectional view taken along line 8-8 as well as in the direction of arrows 8-8 in FIG. 1, showing the tri clamp in an opposite extreme state of being FULLY CLOSED or FULLY CLAMPED.
Figure 9:
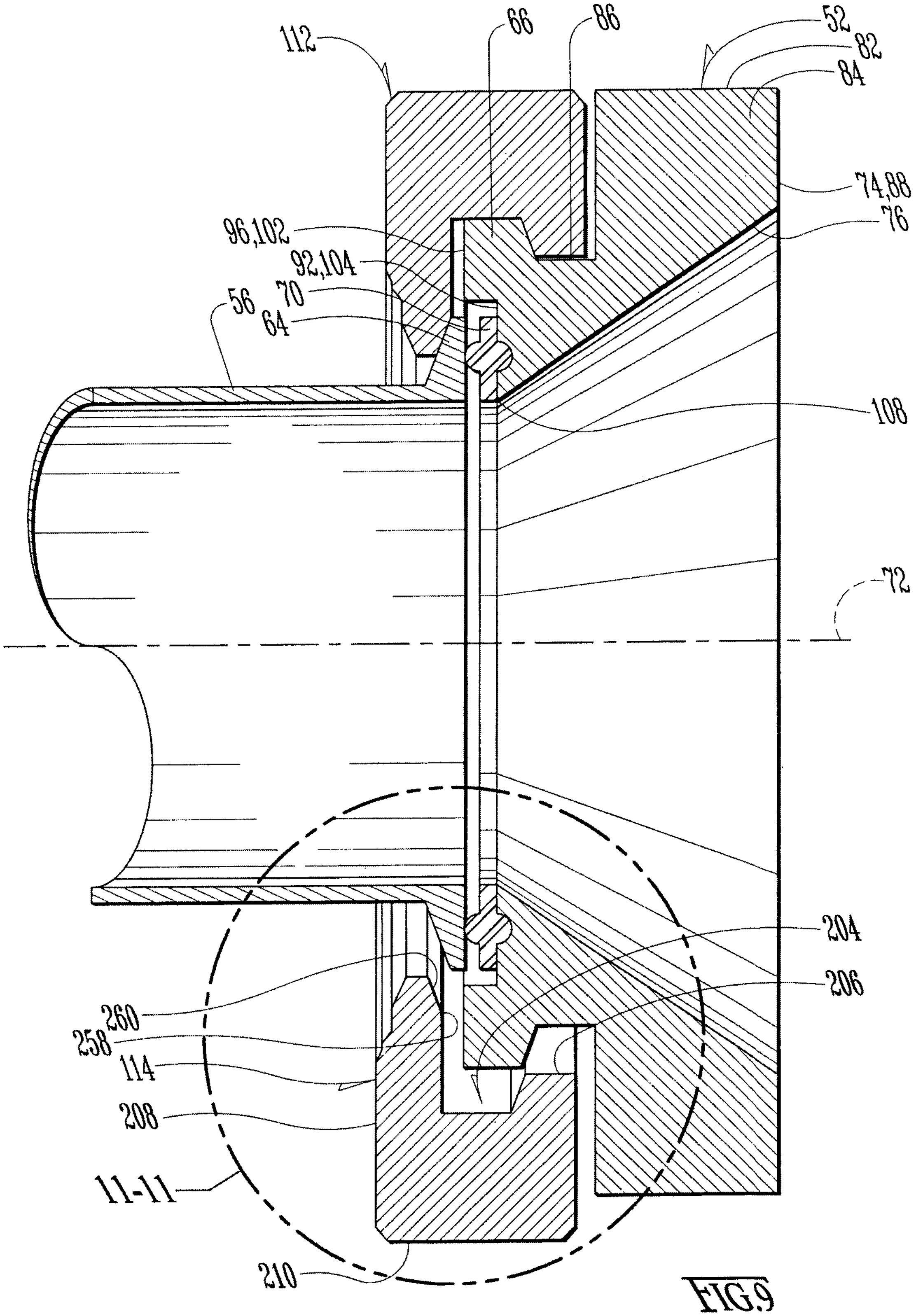
FIG. 9 is an enlarged-scale section view taken along the offset line 9-9 as well as in the direction of arrows 9-9 in FIG. 4, wherein the tri clamp is shown in an intermediate state of being OPENED or LOOSENED.
Figure 10:
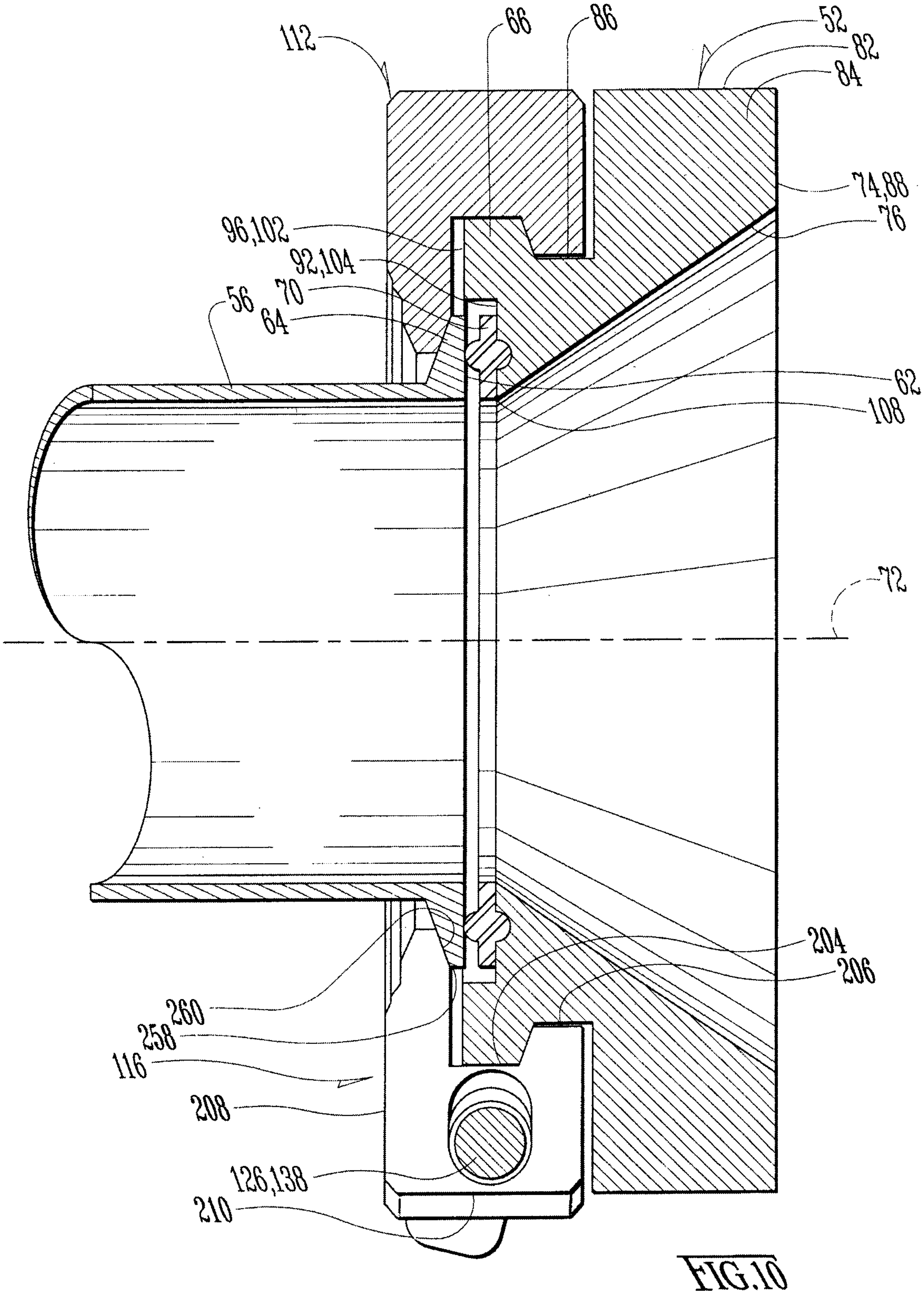
FIG. 10 is an enlarged-scale section view taken along line 10-10 as well as in the direction of arrows 10-10 in FIG. 4, wherein again the tri clamp is shown in an intermediate state of being OPENED or LOOSENED.
Figure 11:
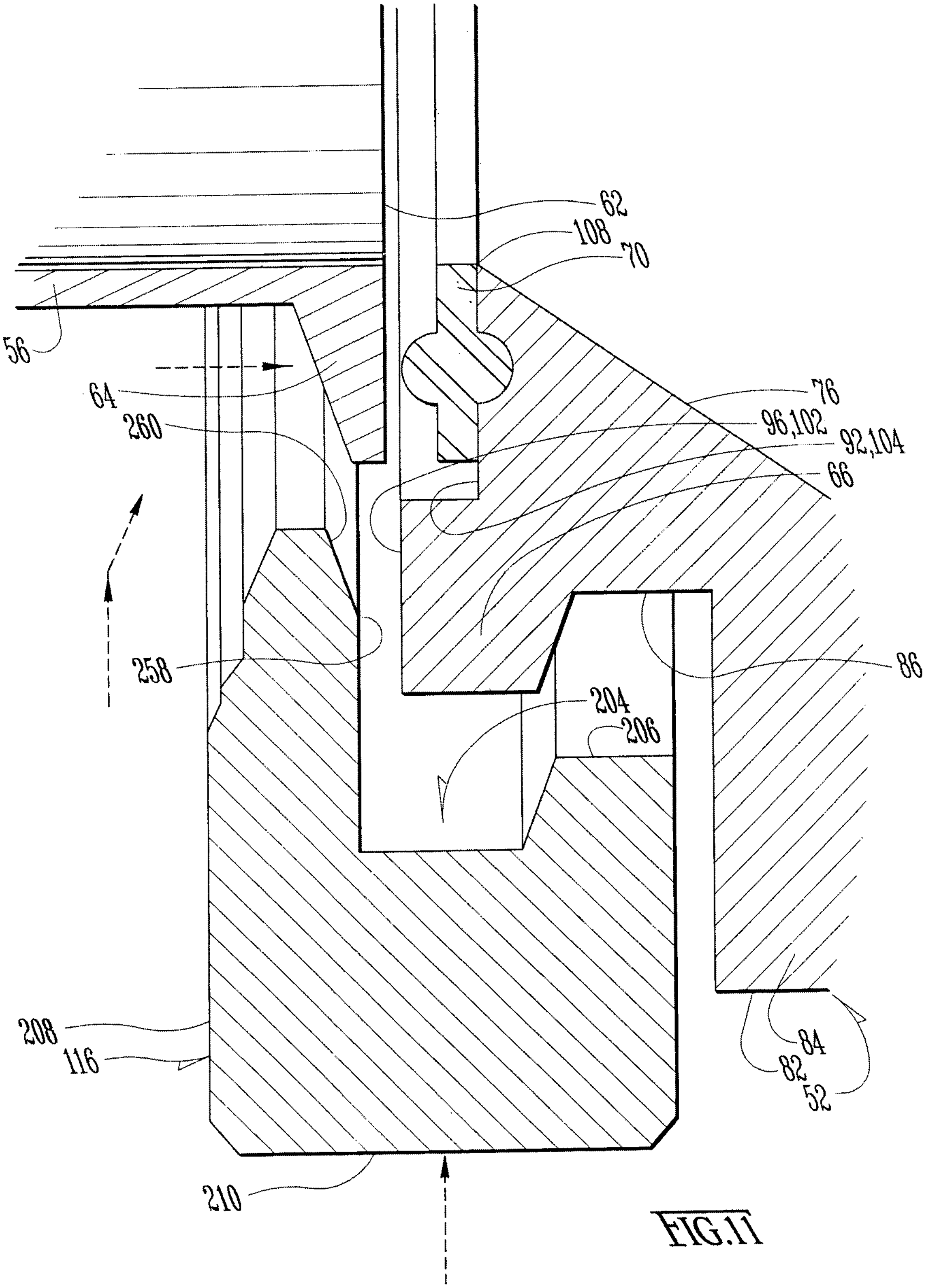
FIG. 11 is an enlarged-scale schematic-in-part section view taken of detail 11-11 in FIG. 9, and albeit while the tri clamp is shown in an intermediate state of being OPENED or LOOSENED, the tri clamp is a little more looser (or little more open) than in FIG. 9.
Figure 12:
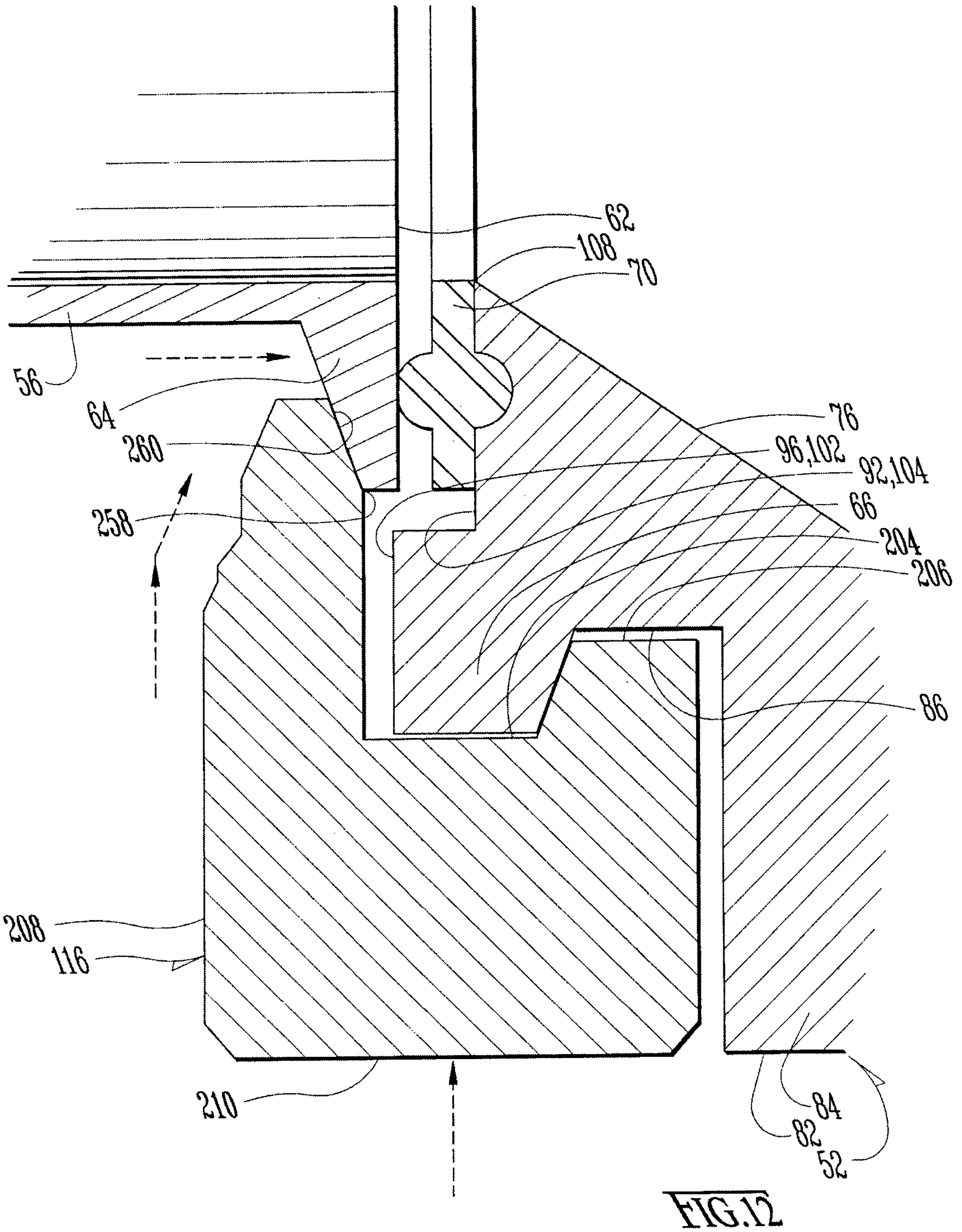
FIG. 12 is an enlarged-scale schematic-in-part section view comparable to FIG. 11 except with the tri clamp being shown in transition from being tightened from an intermediate state of being OPENED or LOOSENED (shown) toward the extreme state of being FULLY CLOSED or FULLY CLAMPED (not yet achieved, not shown)
Figure 16:
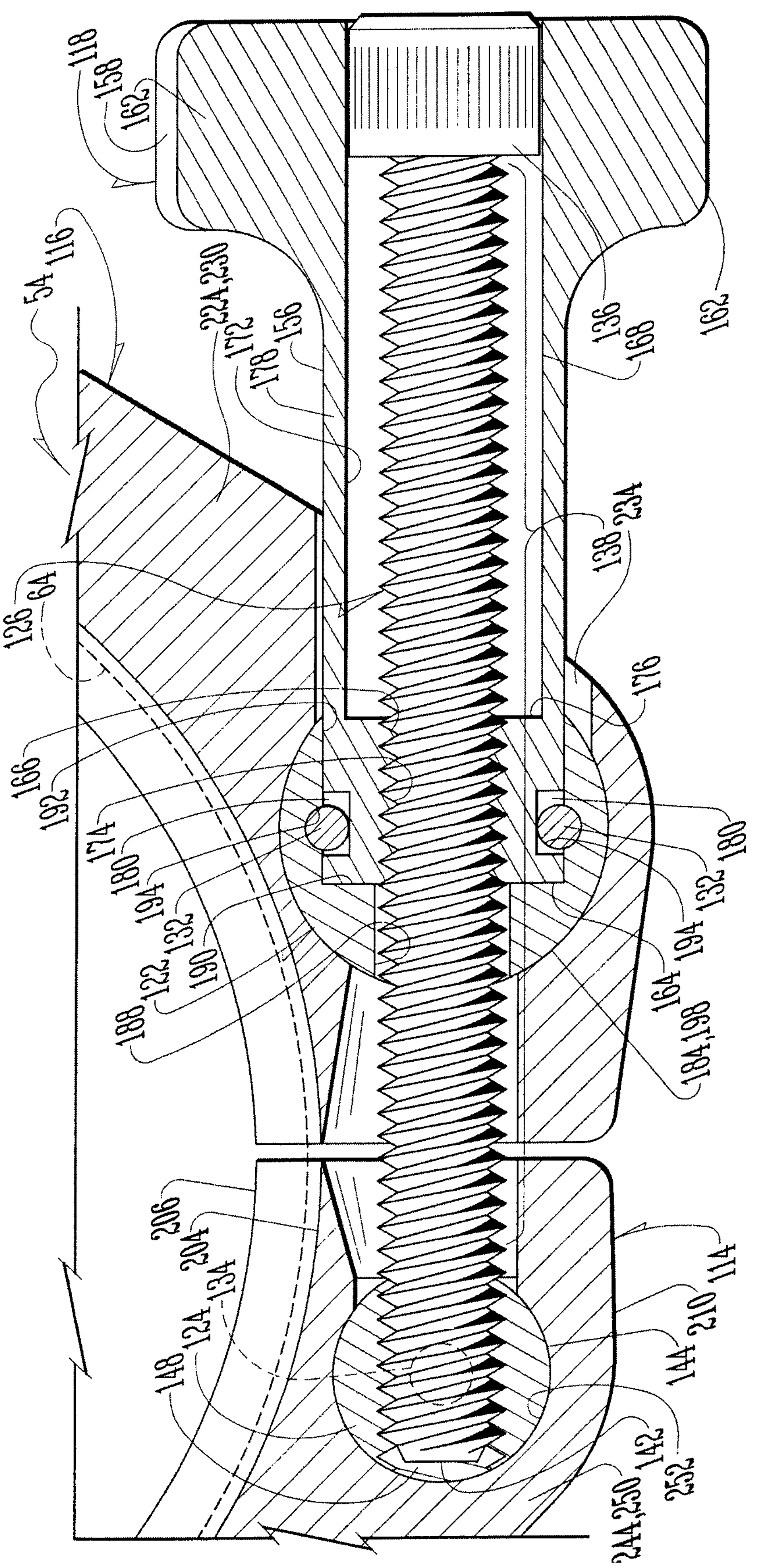
FIG. 16 is an enlarged-scale partial sectional view of the detail 16-16 in FIG. 8.

FIG. 16 is an enlarged-scale partial section view of detail 16-16 in FIG. 8, wherein the tri clamp 54 shown in an extreme state of being FULLY CLOSED or FULLY CLAMPED.

External Ferrule 56 or Tube Connection

The main purpose more or less of the combination 50 in accordance with the invention is to make a releasable connection with a tube end 62 of an external process component or system (external component or system not shown here). The tube connection 56 is typically a weld ferrule 56. The tube connection 56 also terminates in an annular flange 64 which will be sandwiched with the mounting fitting 52's annular flange 66 in the tri clamp 54.

Gasket 70.

FIG. 2 among others shows the inclusion of a prior art polymeric gasket 70. The gasket 70 will be compressed between the tube connection 56's annular flange 64 and the mounting fitting 52's annular flange 66 with the clamp 54 is tightened CLOSED.

Mounting Fitting 52.

The mounting fitting 52 is generally cylindrically symmetric about a central axis 72.

The mounting fitting 52 has an inboard end 74 and an inner sidewall 76.

The inner sidewall 76 is shown for example and without limitation to be conical (cone-shaped) and flares open to the inboard end 74.

The inboard end 74 presents an annular ring seating surface and will typically be attached to a tank, vessel, piping or other sanitary process equipment 58. The typical manner of 'attachment' is welding. Hence the mounting fitting 52 is very typically permanently attached.

The mounting fitting 52 also has an outer sidewall 82.

The mounting fitting 52 is characterized by (as seen in the contours of the outer sidewall 82):

- an inboard enlarged cylindrical base portion 84,
- the outboard annular flange 66, and
- an intermediate annular groove 86, flanked between
  - a seat surface 88 on the inboard enlarged base portion 84, and
  - a seat surface 92 on the outboard annular flange 66.

The seat surfaces 88 and 92 are generally lie in planes perpendicular to the central axis 72. More preferred still is if the seat surface 92 on the annular flange 66 is tapered a little, to slope steeply into the intermediate annular groove 86. This taper helps drive the annular flange 64 of the external ferrule connection 56 against the gasket 70 (eg., by a wedging action).

The mounting fitting 52 has an outboard end 96. The outboard end 96 has various contours including;

- an outer and relatively raised annular ring face 102,
- an inner and relatively recessed annular ring face 104, which is
  - provided with an annular O-ring groove 86.

The O-ring groove 86 serves to seat the gasket 70. The inner and relatively recessed annular ring face 104 and the conical (cone-shaped) inner sidewall 76 that flares open to the inboard axis 72 meet at a sharp annular ledge or crease 108 providing complete draining of liquids from the mounting fitting 52.

Tri-Clamp 54.

The tri clamp 54 has:

- three (3)~one-hundred and twenty degree (~120°) ring segments, namely:—
  - a yoke segment 112,
  - an anchor-side segment 114, and
  - a wingnut-side segment 116, as well as
- a wingnut 118,
- a pivot bearing 122,
- a barrel nut 124 that pivots and anchors a socket head cap screw 126,
- said socket head cap screw 126,
- a pair of flat head shoulder screws 128,
- a pair of miniature dowel pins 132, and
- a miniature socket-head set screw 134.

Socket Head Cap Screw 126.

The socket head cap screw 126 has an enlarged socket-formed head 136 and an elongated threaded shank 138.

Barrel Nut 124.

The barrel nut 124 has an outer sidewall 144 that is cylindrical about the barrel nut 124's own central axis 146 (which will be parallel to the central axis 72 of the mounting fitting 52). The barrel nut 124 has a main threaded socket or through-hole 148 extending into the outer sidewall 144 perpendicular the barrel nut 124's own central axis 146. The tip end 142 of the socket head cap screw 126 is twisted into this threaded socket or through hole 148. The socket head cap screw 126 is preferably secured or 'anchored' there by various measures, such as LOCTITE® thread adhesive, or else including the following. That is, the barrel nut 124 has a threaded side outlet 154 through one of its ends 152, generally centered on the barrel nut 124's own central axis 146. This threaded side outlet 154 receives the miniature socket-head set screw 134 for jamming against the socket head cap screw 126, thereby adding an additional measure of 'anchoring' to lock in the socket head cap screw 126.

Wingnut 118.

The wingnut 118 has an elongated hollow generally cylindrical body 156 extending between a distal end 158 formed with wings 162 and a proximal end 164 which is where the internal threads are. The body 156 of the wingnut 118 is formed with a through bore 168 that has enlarged-size inside diameter portion 172 formed in through the distal end 158 and extending eighty percent (more or less) the length of the bore 168 and sized for free passage of the head 136 of the socket head cap screw 126. The remaining portion 174 of the through bore 168 (twenty percent more or less of the length of the bore 168) comprises a relatively reduced-sized inside diameter portion 174 and is threaded for threaded engagement with the external thread of the socket head cap screw 126. The intersection between the relatively enlarged-size inside diameter portion 172 and relatively reduced-size inside diameter portion 174 forms a shoulder 176 that stops against the head 136 of the socket head cap screw 126 when backing out the wingnut 118, thereby retaining the wingnut 118 'captive' between tightened and loosened extremes. The outer surface of the wingnut 118's sidewall 178 is generally cylindrical, but there is an exception, to be described shortly below.

On the outside of the relatively enlarged-size inside diameter portion 172 of the through bore 168, the wingnut 118's sidewall 178 is relatively thin. But the wingnut 118's sidewall 178 is relatively thicker where the sidewall 178 covers the outside of the threaded and relatively reduced-size inside diameter portion 174. The exception to the outer surface of the sidewall 178 being generally cylindrical is in the sidewall 178's relatively thicker section outside of the threaded and relatively reduced-size inside diameter portion 174. The sidewall 178's relatively thicker section is formed with an annular race (groove) 180 not only sized for receiving the miniature dowel pins 132 at diametrically opposite positions but also sized for revolving freely even with the dowels in occupation of diametrically opposite positions in the race 180.

Pivot Bearing 122.

The pivot bearing 122 has a cylindrical barrel-like body 184 as similar the barrel nut 124. And also similarly, the pivot bearing 122 has a cross-axis through-hole 186 that has a relatively reduced-sized inside diameter portion 188 that is one quarter (more or less) the diameter of the pivot bearing 122 from a side outlet of the through-hole 186 opening toward the barrel nut 124. The relatively reduced-sized inside diameter portion 188 is sized to allow free-axial passage to and fro of the threaded shank 138 of the socket head cap screw 126. The remaining portion 192 of the through-hole 186 comprises a relatively enlarged-size inside diameter portion 192 opening out opposite the opening that face toward the barrel nut 124. The relatively enlarged-size inside diameter portion 192 is sized to allow insertion of the proximal end 164 of the wingnut 118 and spin therein.

The intersection between the relatively enlarged-size inside diameter portion 192 of the pivot bearing 122's through-hole 186 and the relatively reduced-size inside diameter portion 188 the pivot bearing 122's through-hole 186 forms a shoulder 190 which would stop further insertion of the wingnut 118. However, the proximal end 164 of the wingnut 118 is retained captive in the pivot bearing 122 by two miniature pin holes 194 drilled end-to-end through the pivot bearing 122, parallel with the central axis 196 of the pivot bearing 122, and at diametrically opposite positions near the cylindrical outer sidewall 198 of the pivot bearing 122. These miniature pin holes 194 pierce the relatively enlarged-size inside diameter portion 192 of the through-hole 186 through the pivot bearing 122. Moreover, these miniature pin holes 194 are sized and positioned to not only receive respective ones of the miniature dowel pins 132 but also align the dowel pins 132 to extend through the race 180 of the wingnut 118, thereby retaining it 'captive' in the pivot bearing 122.

Yoke Segment 112.

Each of the three segments 112, 114 and 116 are arcuate channels 204 that respectively are about a third of the circumference of a circle apiece. It is an aspect of the invention that when tightened in a clamping arrangement, the three segments 112 as well as 114 and 116 cooperatively form a fully encircling clamp band.

The yoke segment 112 extends (along a curve) between spaced ends 202 and is symmetrical about the center between the spaced ends 202. In cross section, the arcuate channel 204 has an inboard flange 206 and outboard flange 208 flanking a web portion 210. The inboard flange 206 is sized to be received in the intermediate annular groove 86 of the mounting fitting 52. The channel 204 is sized to receive the outboard flange 66 of the mounting fitting 52. The web portion 210 is recessed back at both ends 202 to render the opposed portions 212 of the inboard and outboard flanges 206 and 208 at both ends 202 as opposed ear portions 212. These ear portions 212 are bored through with hinge-pin receiving holes 214 or 216. The holes 214 through the outboard flange 208 are counter sunk for seating of the conic heads of flat head shoulder screws 128 (which serve as the hinge pins). The holes 216 through the inboard flange 206 are threaded for the flat head shoulder screws 128 to thread into.

Wingnut-Side Segment 116.

The wingnut-side segment 116, far from being symmetrical, extends (along a curve) between a hinge-forming end 222 and a spaced wingnut/pivot-bearing receiving end 224. In cross section, the arcuate channel 204 has an inboard flange 206 and outboard flange 208 flanking a web portion 210. The inboard flange 206 is sized to be received in the intermediate annular groove 86 of the mounting fitting 52. The channel 204 is sized to receive the outboard flange 66 of mounting fitting 52. At the hinge end 222, the inboard and outboard flanges 206 and 208 of the wingnut-side segment 116 are recessed back to render the web portion 210 as a tab 226. The tab 226 is formed with an aperture sized to receive and pivot on the shank 228 of one of the flat head shoulder screws 128 when assembled between the ears 212 of one end 202 of the yoke segment 112 and thereby form a hinge.

The distal end 224 of the wingnut-side segment 116 enlarges into a posterior enlargement portion 230. This posterior enlargement portion 230 is formed with one bore 232 parallel with the central axis 72 of the mounting fitting 52 (when the tri clamp 54 is tightened). The posterior enlargement portion 230 in this distal end 224 of the wingnut-side segment 116 is enlarged outwards so that it is external of the outboard flange 66 of the mounting fitting 52 and is sized to rotatably received the pivot bearing 122. The posterior enlargement portion 230 is formed with a second bore 234 perpendicular to the central axis 72 of the mounting fitting 52 (when the tri clamp 54 is tightened), again located in the posterior enlargement portion 230 of the distal end 224 of the wingnut-side segment 116 and spaced radially away from the central axis 72 of the mounting fitting 52 so that this second bore 234 is external and passes outside of the outboard flange 66 of the mounting fitting 52, and is sized to rotatably receive the distal end 224 of the wingnut 118 from the outside and through passage of the socket head cap screw 126 to the anchor-side segment 114.

Anchor-Side Segment 114.

The anchor-side segment 114 is also not symmetrical and extends (along a curve) between a hinge-forming end 242 and a spaced barrel-nut receiving end 244. In cross section, the arcuate channel 204 has an inboard flange 206 and outboard flange 208 flanking a web portion 210. The inboard flange 206 is sized to be received in the intermediate annular groove 86 of the mounting fitting 52. The channel 204 is sized to receive the outboard flange 66 of mounting fitting 52. At the hinge-forming end 242, the inboard and outboard flanges 206 and 208 of the anchor-side segment 114 are recessed back to render the web portion 210 as a tab 246. The tab 246 is formed with an aperture sized to receive and pivot on the shank 228 of the other of the flat head shoulder screws 128 when assembled between the ears 212 of the other end 202 of the yoke segment 112 and thereby form a second hinge.

The distal end 244 of the anchor-side segment 114 enlarges into a posterior enlargement portion 250. This posterior enlargement portion 250 is formed with a single bore 252 parallel with the central axis 72 of the mounting fitting 52 (when the tri clamp 54 is tightened) and spaced radially away from the central axis 72 of the mounting fitting 52 so that the single bore 252 is external of the outboard flange 66 of the mounting fitting 52 and is sized to rotatably receive the barrel nut 124.

To turn to some general matters for all three segments 112 as well as 114 and 116, the outboard flanges 208 have inboard edges 258 that are preferably formed with a chamfer 260 so that when clamped tight against the annular flange 64 of the external weld ferrule 56 (external tube connection), these chamfers 260 drive the annular flange 64 of the external ferrule connection 56 against the gasket 70 (eg., by a wedging action).

Restricted Range of Motion and Geometry:—'Overbite,' in a Figurative Sense.

Again, barrel nut 124 has a threaded side outlet 154 for receiving the miniature socket-head set screw 134 to lock in the socket head cap screw 126. This aspect provides for the restricted range of opening of the tri clamp 54. The miniature set screw 134 can be undone, and the socket head cap screw 126 can be adjusted clockwise or counterclockwise to correspondingly adjust the restricted range of motion.

To turn to geometry, it is an aspect of the invention that, for all three segments 112 as well as 114 and 116 (when the tri clamp 54 is tightened), the inboard flanges 206 define a considerably larger diameter circle than the outboard flanges 208.

To put this differently, it is an aspect of the invention that the channel 204 defined by each segment 112 as well as 114 and 116 is highly asymmetrical.

To be sure, the segments 112 as well as 114 and 116 are all configured with comparably sized channels 204 with respect to each other. But the inboard flanges 206 define a considerably larger diameter circle than the outboard flanges 208. To consider this another way, the outboard flanges 208 are proportioned relative to the inboard flanges 206 to exhibit (figuratively) significant 'overbite.'

For example, if the outboard flanges 208 cooperatively circumscribe a circle with a radius of about three-fourths an inch (0.75 in. or 19.05 mm) (eg., for a nominal 1.5 inch OD ferrule 56), the inboard flanges 206 might cooperatively circumscribe a circle which has a radius three-eights an inch greater (0.375 in. or 9.525 mm). That three-eights an inch (0.375 in. or 9.525 mm) difference represents the figurative overbite.

To flip the comparison of this example, the inboard flanges 206 (which fit into the intermediate annular groove 86 of the mounting fitting 52) cooperatively circumscribe a circle which has a one-hundred and fifty percent (150%) greater radius (or diameter) than the circle cooperatively defined by the outboard flanges 208 (which fit around the external ferrule 56's outer sidewall 68).

And to examine this example in a further different way, the diameter of the intermediate annular groove 86 of the mounting fitting 52 is about one-hundred and fifty percent (150%) greater than the diameter of the external ferrule 56's outer sidewall 68.

Given the foregoing, the tri clamp 54 can be loosened by backing off the wingnut 118, but the proportions/geometric-ratios of the various flanges 64, 66, 206 and 208 of the combination 50 as a whole are such that the external ferrule 56 or piping connection can be released from the tri clamp 54, but the wingnut 118 can only be backed off so far until it will be stopped at a loosened extreme such that the tri clamp 54 cannot be taken off the mounting fitting 52.

The advantage is, that both the coupling and uncoupling the external ferrule 56 or piping connection to the mounting fitting 52 by means of this tri clamp 54 in accordance with the invention, become simply a one-person, nearly one-handed operation.

It's as simple as (1) position the ferrule 56 and (2) tighten. Easy. Fast. Done.

In a little bit more detail, when connecting an external ferrule connection 56 to the mounting fitting 52, the gasket 70 is first inserted into the O-ring (gasket) groove 106 on the mounting fitting 52. Then the external ferrule connection 56 is inserted into the tri clamp 54 assembly mating with the gasket 70. The wingnut 118 on the clamp assembly 54 is tightened compressing the clamp assembly 54 and seating the gasket 70 for operation.

In the reverse (undoing the connection), the wingnut 118 is loosened to the maximum amount which will release the external ferrule connection 56 from the clamp assembly 54. The external ferrule connection 56 is then removed. And the gasket 70 is also removed.

For maintenance of the mounting fitting 52 (or the tri clamp 54), the tri clamp 54 can be removed by removing one of the hinge screws to separate two of the tri clamp 54's segments 112 as well as 114 and 116 from each other. The wingnut 118 is loosened and the tri clamp 54 can be manipulated to become free from the mounting fitting 52.

Again, the tri clamp 54 can be easily removed from the mounting fitting 52 by removing either of the flat head shoulder screws 128 from the tri clamp 54 allowing the yoke segment 112 to be swung upwards allowing for removal of the tri clamp 54 for maintenance and cleaning.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. In a sanitary tank assembly, a combination (50) of a mounting fitting (52), a clamp assembly (54), and a releasable ferrule connection (56) to mount to the mounting fitting (52) and be releasably clamped thereto by the clamp assembly (54); said combination (50) comprising:

a mounting fitting (52) defining a flow passage characterized by a center axis (72);

a releasable ferrule connection (56) disposed relatively outboard of the mounting fitting (52) and which terminates in an inboard-facing annular flange (64);

the mounting fitting (52) having a body that has an inner sidewall (76) and an outer sidewall (82), and, which terminates in an outboard-facing annular flange (66);

the mounting fitting (52) being characterized, as by contours of the outer sidewall (82): an inboard base portion (84), the outboard-facing annular flange (66), and an intermediate annular groove (86) flanked between an outwardly-extending annular seat surface on the inboard base portion (84) and an outwardly-extending annular seat surface on the outboard annular flange (66);

a clamp assembly (54) comprising a central yoke segment (112) flanked between and pivotally connected (128) at the opposite ends (202) thereof to an anchor-side segment (114) and a wingnut-side segment (116);

wherein the anchor-side segment (114) and wingnut-side segment (116) are respectively arcuately elongated from the respective pivotal connections (128) with the respective ends (202) of the yoke segment (112) to a respective anchor-side end (244) and wingnut-side receiving end (224) respectively;

wherein the clamp segments (112, 114, 116), when the clamp assembly (54) is tightened into a clamped state, cooperatively define a fraction of a circumference of an arcuate race (204) defined between an inboard inwardly-extending annular seat surface and an outboard inwardly-extending annular seat surface; and wherein the arcuate race (204), when the clamp assembly (54) is tightened into a clamped state, is sized to receive the inboard-facing annular flange (64) of the ferrule connection (56) and the outboard-facing annular flange (66) of the mounting fitting (52);

said combination (50) further comprising:

a threaded rod (126, 138) that has a distal end pivotally anchored with respect to the anchor-side end (244) of the anchor-side segment (114) whereby the distal end (126) is anchored against removal, twisting, and, afforded some pivotal scope in a plane generally perpendicular to the center axis (72); and a wingnut assembly (118) comprising an elongated hollow body (156) with a threaded portion (164) formed with internal thread to engage the threads (138) of the threaded rod (126);

wherein the wingnut assembly (118) is rotationally and pivotally coupled with respect to the wingnut-side receiving end (224) of the wingnut-side segment (116) whereby the wingnut assembly (118) is afforded some pivotal scope to remain on axis with the threaded rod (126, 138) and whereby can be manually tightened and loosened thereon;

wherein the threaded rod (126, 138) comprises an elongated shank (138) that terminates in a proximal end portion (136) with portions intermediate of the anchor-side end (244) of the anchor-side segment (114) and the proximal end portion (136) that project through and past the threaded portion (164) of the elongated hollow body (156);

wherein the anchor-side end (244) of the anchor-side segment (114) and the wingnut assembly (118) are cooperatively formed with a stop provision to stop the wingnut assembly (118) from loosening beyond an extreme stopped state whereby the wingnut assembly (118) can only be manually tightened and loosened between a clamped state and the extreme stopped state, the outboard-facing annular flange (66) of the mounting fitting (52) has an outer circumference, the outboard inwardly-extending annular seat surface of the clamp assembly (54) has an inner circumference, the inboard inwardly-extending annular flange of the clamp assembly (54) has an inner circumference, the inboard-facing annular flange (64) of the releasable ferrule connection (56) has an outer circumference, and which circumferences are sized such that, when the clamping assembly is (54) is loosened in the extreme stopped state:

the inner circumference of the inboard inwardly-extending annular flange of the clamp assembly (54) is less than the outer circumference of the outboard-facing annular flange (66) of the mounting fitting (52), the inner circumference of the outboard inward-extending annular seat surface of the clamp assembly (54) is greater than the outer circumference of the inboard-facing annular flange (64) of the releasable ferrule connection (56), so that when the clamping assembly (54) is loosened to the extreme stopped state, the inboard-facing annular flange (64) of the releasable ferrule connection (56) can be slipped through and out past the loosened outboard inward-extending annular seat surface of the clamp assembly (54), but, the loosened inboard inward-extending annular flange of the clamp assembly (54) cannot be slipped over and out past the outboard-facing annular flange (66) of the mounting fitting (52);

whereby the clamp assembly (54) cannot be taken off the mounting fitting (52) by unloosening the wingnut assembly (118) alone.

2. The combination (50) of claim 1, wherein:

the inner circumference of the outboard inward-extending annular seat surface of the clamp assembly (54) is less than the inner circumference of the inboard inward-extending annular flange of the clamp assembly (54).

3. The combination (50) of claim 1, wherein:

the outer circumference of the outboard-facing annular flange (66) of the mounting fitting (52) exceeds the outer circumference of the inboard-facing annular flange (64) of the releasable ferrule connection (56) by about 125% or in excess.

4. The combination (50) of claim 1, wherein:

the pivotal connections (128) comprise at least one hinge fastener (128) that connects the yoke segment (112) with one or the other two segments (114, 116);

whereby the clamp assembly (54) is removed from the mounting fitting (52) by undoing that fastener (128) but not by loosening the wingnut assembly (118) until the clamp assembly (54) reaches the extreme stopped state.

5. The combination (50) of claim 1, wherein:

the threaded portion (164) of the wingnut assembly (118) moves along both while being tightened and loosed threaded rod (126, 138) such that when the clamp assembly (54) is loosened to the extreme stopped state, the clamp assembly (54) self-holds a wide open state;

whereby the repeated making of manual connections and manual disconnections among the releasable ferrule connection (56), the clamp assembly (54) and the mounting fitting (52) is more comfortably an operation for a single person.

6. The combination (50) of claim 1, wherein:

the outwardly-extending annular seat surface on the inboard base portion (84) of the mounting fitting (52) has an outer circumference which is no less or greater than the outer circumference of the outboard-facing annular flange (66) of the mounting fitting (52);

whereby the outboard-facing annular flange (66) is trapped in the annular groove (86) of the clamp assembly (54) regardless whether the clamp assembly (54) is tightened or loosened between a clamped state and the extreme stopped state.

7. The combination (50) of claim 1, wherein:

one, the other or both of the outwardly-extending annular seat surface on the outboard annular flange (66) of the mounting fitting (52) and the inboard inwardly-extending annular seat surface of the clamp assembly (54) is or are not perpendicular to but relatively tapered with respect to the center axis (72);

whereby, when the wingnut assembly (118) is tightened, the outwardly-extending annular seat surface on the outboard annular flange (66) and the inboard inwardly-extending annular seat surface of the clamp assembly (54) drive the ferrule connection (56) forcibly into the mounting fitting (52) by a wedging action.

8. The combination (50) of claim 1, wherein:

the proximal end portion (136) of the threaded rod (126, 138) is disposed within the elongated hollow body (156) of the wingnut assembly (118);

the proximal end of the threaded rod (126, 138) is formed with a shoulder facing the distal end of the threaded rod (126, 138); and the elongated hollow body (156) of the wingnut assembly (118) is formed with an opposing shoulder;

wherein the stop provision comprises the one shoulder and the opposing shoulder;

whereby the elongated hollow body (156) of the wingnut assembly (118) can travel axially on the threaded rod (126, 138) between a clamped state and the extreme stopped state; and whereby the extreme stopped state is determined by when the shoulder of the proximal end of the threaded rod (126, 138) jams stopped against the opposing shoulder of the elongated hollow body (156) of the wingnut assembly (118).

9. In a sanitary tank assembly, a combination (50) of a mounting fitting (52), a clamp assembly (54), and a releasable ferrule connection (56) to mount to the mounting fitting (52) and be releasably clamped thereto by the clamp assembly (54); said combination (50) comprising:

a mounting fitting (52) defining a flow passage;

a releasable ferrule connection (56) disposed relatively outboard of the mounting fitting (52) and which terminates in an inboard-facing annular flange (64);

the mounting fitting (52) having an inboard base portion (84), a spaced away outboard-facing annular flange (66), and an intermediate annular groove (86) flanked therebetween;

a clamp assembly (54) comprising a central yoke segment (112) flanked between and pivotally connected (128) at the opposite ends (202) thereof to an anchor-side segment (114) and a wingnut-side segment (116);

wherein the anchor-side segment (114) and wingnut-side segment (116) are respectively arcuately elongated from the respective pivotal connections (128) with the respective ends (202) of the yoke segment (112) to a respective anchor-side end (244) and wingnut-side receiving end (224) respectively;

wherein the clamp segments cooperatively define an arcuate race (204) defined between an inboard inwardly-extending annular flange and an outboard inwardly-extending annular flange;

wherein the arcuate race (204), when the clamp assembly (54) is tightened into a clamped state, is sized to receive the inboard-facing annular flange (64) of the ferrule connection (56) and the outboard-facing annular flange (66) of the mounting fitting (52);

said combination (50) further comprising:

a threaded rod (126, 138) that has a distal end pivotally anchored with respect to the anchor-side end (244) of the anchor-side segment (114) whereby the distal end (126) is anchored against removal, twisting, and, afforded some pivotal scope in a plane generally perpendicular to the flow passage; and a wingnut assembly (118) comprising an elongated hollow body (156) with a threaded portion (164) formed with internal thread to engage the threads (138) of the threaded rod (126);

wherein the wingnut assembly (118) is rotationally and pivotally coupled with respect to the wingnut-side receiving end (224) of the wingnut-side segment (116) whereby the wingnut assembly (118) is afforded some pivotal scope to remain on axis with the threaded rod (126, 138) and whereby can be manually tightened and loosened thereon;

wherein the threaded rod (126, 138) comprises an elongated shank (138) that terminates in a proximal end portion (136) with portions intermediate of the anchor-side end (244) of the anchor-side segment (114) and the proximal end portion (136) that project through and past the threaded portion (164) of the elongated hollow body (156);

wherein the anchor-side end (244) of the anchor-side segment (114) and the wingnut assembly (118) are cooperatively formed with a stop provision to stop the wingnut assembly (118) from loosening beyond an extreme stopped state whereby the wingnut assembly (118) can only be manually tightened and loosened between a clamped state and the extreme stopped state, the outboard-facing annular flange (66) of the mounting fitting (52) has an outer circumference, the outboard inwardly-extending annular flange of the clamp assembly (54) has an inner circumference, the inboard inwardly-extending annular flange of the clamp assembly (54) has an inner circumference, the inboard-facing annular flange (64) of the releasable ferrule connection (56) has an outer circumference, and which circumferences are sized such that, when the clamping assembly is (54) is loosened in the extreme stopped state:

the inner circumference of the inboard inwardly-extending annular flange of the clamp assembly (54) is less than the outer circumference of the outboard-facing annular flange (66) of the mounting fitting (52), the inner circumference of the outboard inward-extending annular flange of the clamp assembly (54) is greater than the outer circumference of the inboard-facing annular flange (64) of the releasable ferrule connection (56), so that when the clamping assembly (54) is loosened to the extreme stopped state, the inboard-facing annular flange (64) of the releasable ferrule connection (56) can be slipped through and out past the loosened outboard inward-extending annular flange of the clamp assembly (54), but, the loosened inboard inward-extending annular flange of the clamp assembly (54) cannot be slipped over and out past the outboard-facing annular flange (66) of the mounting fitting (52);

whereby the clamp assembly (54) cannot be taken off the mounting fitting (52) by unloosening the wingnut assembly (118) alone.

10. The combination (50) of claim 9, wherein:

the inner circumference of the outboard inward-extending annular flange of the clamp assembly (54) is less than the inner circumference of the inboard inward-extending annular flange of the clamp assembly (54).

11. The combination (50) of claim 9, wherein:

the outer circumference of the outboard-facing annular flange (66) of the mounting fitting (52) exceeds the outer circumference of the inboard-facing annular flange (64) of the releasable ferrule connection (56) by about 125% or in excess.

12. The combination (50) of claim 9, wherein:

the pivotal connections (128) comprise at least one hinge fastener (128) that connects the yoke segment (112) with one or the other two segments (114, 116);

whereby the clamp assembly (54) is removed from the mounting fitting (52) by undoing that fastener (128) but not by loosening the wingnut assembly (118) until the clamp assembly (54) reaches the extreme stopped state.

13. The combination (50) of claim 9, wherein:

the threaded portion (164) of the wingnut assembly (118) moves along both while being tightened and loosed threaded rod (126, 138) such that when the clamp assembly (54) is loosened to the extreme stopped state, the clamp assembly (54) self-holds a wide open state;

whereby the repeated making of manual connections and manual disconnections among the releasable ferrule connection (56), the clamp assembly (54) and the mounting fitting (52) is more comfortably an operation for a single person.

14. The combination (50) of claim 9, wherein:

the outwardly-extending annular flange on the inboard base portion (84) of the mounting fitting (52) has an outer circumference which is no less or greater than the outer circumference of the outboard-facing annular flange (66) of the mounting fitting (52);

whereby the outboard-facing annular flange (66) is trapped in the annular groove (86) of the clamp assembly (54) regardless whether the clamp assembly (54) is tightened or loosened between a clamped state and the extreme stopped state.

15. The combination (50) of claim 9, wherein:

one, the other or both of the outwardly-extending annular flange on the outboard annular flange (66) of the mounting fitting (52) and the inboard inwardly-extending annular flange of the clamp assembly (54) is or are not perpendicular to but relatively tapered with respect to the center axis (72);

whereby, when the wingnut assembly (118) is tightened, the outwardly-extending annular flange on the outboard annular flange (66) and the inboard inwardly-extending annular flange of the clamp assembly (54) drive the ferrule connection (56) forcibly into the mounting fitting (52) by a wedging action.

16. The combination (50) of claim 9, wherein:

the proximal end portion (136) of the threaded rod (126, 138) is disposed within the elongated hollow body (156) of the wingnut assembly (118);

the proximal end of the threaded rod (126, 138) is formed with a shoulder facing the distal end of the threaded rod (126, 138); and the elongated hollow body (156) of the wingnut assembly (118) is formed with an opposing shoulder;

wherein the stop provision comprises the one shoulder and the opposing shoulder;

whereby the elongated hollow body (156) of the wingnut assembly (118) can travel axially on the threaded rod (126, 138) between a clamped state and the extreme stopped state; and whereby the extreme stopped state is determined by when the shoulder of the proximal end of the threaded rod (126, 138) jams stopped against the opposing shoulder of the elongated hollow body (156) of the wingnut assembly (118).

* * * * *